No. 654,735.  
L. F. JORDAN.  
COUPLING.  
(Application filed Mar. 30, 1900.)  
(No Model.)  
Patented July 31, 1900.  
2 Sheets—Sheet 1.

Witnesses  
H. C. Shaw  
Marion Richards.

Inventor.  
Linwood F. Jordan.  
By  
Attorneys

No. 654,735. Patented July 31, 1900.
L. F. JORDAN.
COUPLING.
(Application filed Mar. 30, 1900.)

(No Model.) 2 Sheets—Sheet 2.

Witnesses
H. C. Shaw
Marion Richards.

Inventor
Linwood F. Jordan
By
Venice Clifford
Attorneys.

UNITED STATES PATENT OFFICE.

LINWOOD F. JORDAN, OF PORTLAND, MAINE.

COUPLING.

SPECIFICATION forming part of Letters Patent No. 654,735, dated July 31, 1900.

Application filed March 30, 1900. Serial No. 10,740. (No model.)

*To all whom it may concern:*

Be it known that I, LINWOOD F. JORDAN, a citizen of the United States, residing at Portland, in the county of Cumberland and State of Maine, have invented certain new and useful Improvements in Couplings; and I do hereby declare the following to be a full, clear, and exact description of the invention, such as will enable others skilled in the art to which it appertains to make and use the same.

My invention relates to improvements in couplings, and especially relates to means for coupling flexible pipes either of lead, rubber, or woven material. It is designed to be used so that the ends of the pipes may be readily and easily joined and to obviate the need of solder, red lead, &c., or, as in the case of lead pipes, of wiping the joints, and it still further obviates the need of washers or gaskets, which are so essential in the ordinary forms of couplings now used.

To this end it consists of a body provided with a beveled or flaring seat against which the ends of the pipe may rest when in position.

It further consists of means for expanding the ends of the pipes to be coupled and in means for drawing the pipes together and holding them upon the beveled seat so that a perfectly water-tight connection can be made without the intervention of gaskets, washers, or other additional means.

In joining the ends of pipes it has been found very difficult to make a tight joint without the use of some cementing material, as red lead, solder, or, as in the case of lead pipes, wiping the joints. This causes additional labor and expense, and, besides, when it is desired to break the joints the process very often results in the destruction of the pipe. In my invention this difficulty is done away with, for by forcing, as I do, the end of a pipe which has been previously flared over a flaring seat and causing a portion of the flaring seat to extend within the flaring end of the pipe and holding the same close thereon a tight joint is made without the use of any further materials, for it presents a larger and longer bearing than is usually the case in coupling pipes end on, and at the same time by turning back a portion of the projecting end of the pipe makes a tight and at the same time a firm joint.

Figure 1:
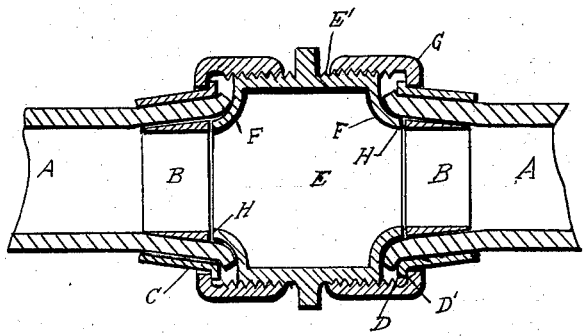
Figure 2:
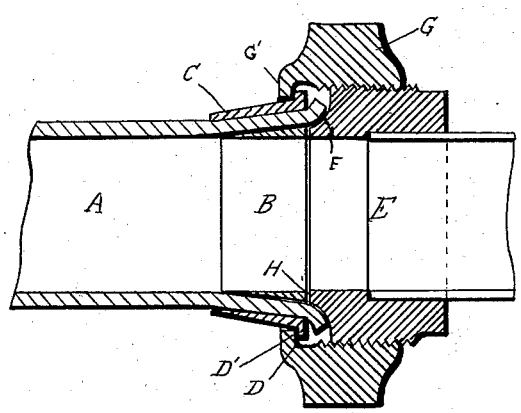
Figure 3:
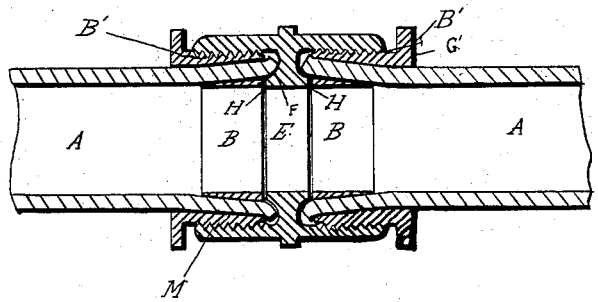
Figure 4:
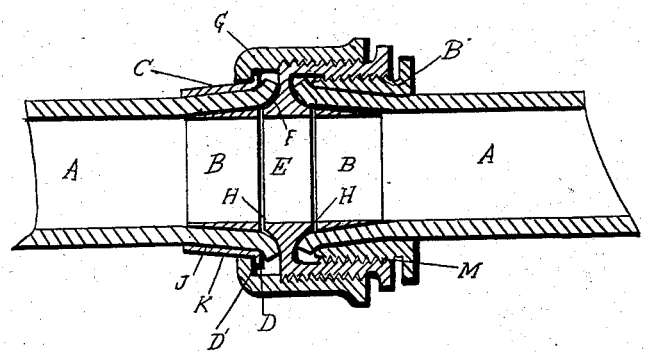

In the drawings herewith accompanying and forming a part of this application, Figure 1 is a central vertical section of my improved coupling, showing a form used for coupling two lengths of pipe. Fig. 2 is a central vertical section showing means of coupling pipe to some source of supply, as to the water-tank of a locomotive. Fig. 3 is a central vertical section showing a slightly-different form of a double coupling. Fig. 4 is a central vertical section of the combination as shown in Figs. 2 and 3.

Same letters of reference refer to like parts in all the figures.

In said drawings, A represents portions of a pipe to be coupled; B, a hollow conical expander adapted to be driven within the ends of the pipe to cause the same to be expanded and which is so driven within the ends of the pipe that the ends thereof extend beyond the said expansion-ring.

C represents rings adapted to be driven over the pipe to be coupled and provided with a slightly-tapering internal bore to correspond with the taper on the pipe caused by driving the conical expanding-ring B into the pipe. These rings may be screw-threaded on their exterior, as shown at B' in Fig. 3, or may be provided with an annular flange D, as shown in Figs. 1 and 2. The body E, to which the pipe may be coupled, consists of a hollow tubular portion screw-threaded on its exterior, as seen at E', and provided with a beveled or flaring shoulder F to receive the ends of the pipe A.

G, Figs. 1 and 2, is a ring screw-threaded on its interior, adapted to be screwed over said coupling in order to draw the ends of the pipe down over the beveled edges of the body. The edge H of the bevel on the face of the coupling is adapted to abut against the hollow expanding-rings B, which are inserted within the pipe. From this it will be readily seen that as the ring G is screwed up upon the coupling the edge of the flaring face will bear against the conical rings and drive the same within the pipe, causing the same to be slightly expanded, as the smallest diameter of said flaring seat coincides with the diameter of the expanding-rings. The end of the pipe is prevented from excessive expansion by the rings C, which also tend to force the end of the pipe down upon the flaring seat, thereby filling in the seat and making a tight joint between the interior wall of the pipe and flaring seat. It will be seen that the ring G, as also the ring C, may be either provided with a flange G', so that the pipe may be drawn tightly down over the collar, or the rings may be provided with screw-threads, which accomplish the same result. In either form the rings are interiorly flaring, so as to conform to the flare on the end of the pipe to be coupled, caused by driving the expansion-ring on the end of the pipe. This flaring interior also serves the additional purpose of drawing the pipe up onto the flaring seat.

Fig. 4 shows a slight modification of my coupler combining in one coupling both the flanged ring and the screw-threaded ring. In this it will be seen that the pipes to be joined are provided with the conical-shaped expanding-rings B, the main body E having beveled faces F on each side, the edges H of which are adapted to abut against the conical expanding-rings and force the same within the pipe, causing at the same time a portion of the pipe end to protrude and fit tightly over the flaring seat. It also shows the drawing-rings, one, C, having both an interior taper J and exterior taper K and an annular flange D, a ring G screw-threaded on its interior and also provided with a flange D', adapted to bear against the flange on the drawing-ring and force the end of the pipe upon the beveled seat of the main body. The main body E is also screw-threaded both exteriorly and interiorly, so as to allow the ring G to be screwed up on it and also to allow the ring C, which is screw-threaded on its exterior, as shown at M, to be screwed therein.

I do not wish to limit myself to the exact forms of construction shown, for some of the mechanical details may be altered or changed without departing from the spirit of my invention.

Having thus described my invention and its use, I claim—

1. In a coupling, a pipe, an independent conical expanding-ring inserted in the end of said pipe, a main body provided with a flaring seat and means for forcing the flaring end of the pipe down upon said flaring seat, whereby a close joint is formed between said seat and the interior of said pipe.

2. In a coupling, a flexible pipe, an independent conical expanding-ring inserted within the end thereof, a body provided with a flaring seat to receive the end of the pipe, means for drawing the ends of the pipes down upon said seat, whereby the outer face of the expanding-ring registers with the end of the seat and the interior wall of the pipe makes a tight joint with the flaring wall of the seat.

3. In a coupling, a flexible pipe, an independent conical expanding-ring within said pipe, the end of the pipe extending beyond said ring, a body provided with a flaring seat to receive the protruding end of the pipe, interiorly-flaring ring surrounding the outside of the pipe and provided with an annular flange, a threaded ring provided with an annular flange adapted to be screwed into the said body and force the end of the pipe down over said flaring seat, whereby a tight joint is formed.

4. In a coupling, a flexible pipe, an independent conical expanding-ring within said pipe, the end of said pipe projecting beyond said ring, a tubular central body provided with a tapering seat surrounding the opening, the smallest diameter of said tapering seat corresponding with the diameter of said expanding-ring and means for forcing said pipe down upon said seat, the cone of the seat entering the flaring end of the pipe and driving said independent expanding-ring within the pipe.

5. In a coupling for uniting the ends of pipes, a main body provided with a flaring seat at each end and threaded interiorly and exteriorly, pipes provided with conical expanding-rings, one provided with an interiorly and exteriorly flaring conical ring with a flange thereon and a threaded nut adapted to mesh with the exterior thread on said body and having a flange adapted to engage the flange on said outside ring and the other provided with exteriorly-threaded and interiorly-flaring nipple adapted to mesh with the interior thread on the body.

6. In a coupling, a main body provided with a flaring seat, a pipe having an independent conical expanding-ring in the end thereof, means for drawing the flaring end of said pipe down over said seat and means for forcing the interior of said pipe closely against the flaring face of said seat.

7. In a coupling, a pipe, an independent conical expanding-ring inserted in the end of said pipe, an interiorly-flaring ring applied to the outside of the end of said pipe and provided with a flange, a main body provided with a flaring seat and threaded exteriorly and a coupling-ring threaded interiorly to mesh with the thread on the main body and having a flange to engage the flange on the outside ring on the pipe.

In testimony whereof I affix my signature, in presence of two witnesses, this 27th day of March, 1900.

LINWOOD F. JORDAN.

Witnesses:
 NATHAN CLIFFORD,
 ELGIN C. VERRILL.